United States Patent
Stevens et al.

(10) Patent No.: US 9,604,781 B2
(45) Date of Patent: Mar. 28, 2017

(54) PICKING STATION WITH AUTOMATED WAREHOUSE

(71) Applicant: Dematic Corp., Grand Rapids, MI (US)

(72) Inventors: Criston S. Stevens, Layton, UT (US); Martin E. Schubilske, Brookfield, WI (US)

(73) Assignee: DEMATIC CORP., Grand Rapids, MI (US)

( * ) Notice: Subject to any disclaimer, the term of this patent is extended or adjusted under 35 U.S.C. 154(b) by 65 days.

(21) Appl. No.: 14/797,222

(22) Filed: Jul. 13, 2015

(65) Prior Publication Data
US 2016/0009493 A1    Jan. 14, 2016

Related U.S. Application Data

(60) Provisional application No. 62/023,421, filed on Jul. 11, 2014.

(51) Int. Cl.
*G06F 7/00* (2006.01)
*B65G 1/137* (2006.01)
*G05B 15/02* (2006.01)

(52) U.S. Cl.
CPC ......... *B65G 1/1373* (2013.01); *B65G 1/1378* (2013.01); *G05B 15/02* (2013.01)

(58) Field of Classification Search
None
See application file for complete search history.

(56) References Cited

U.S. PATENT DOCUMENTS

| | | |
|---|---|---|
| 4,518,302 A | 5/1985 | Knapp |
| 5,395,206 A | 3/1995 | Cerny, Jr. |

(Continued)

FOREIGN PATENT DOCUMENTS

| | | |
|---|---|---|
| DE | 29912230 U1 | 12/1999 |
| DE | 10234150 A1 | 5/2003 |

(Continued)

OTHER PUBLICATIONS

International Search Report (Form PCT/ISA/210) and Written Opinion of the International Searching Authority (Form PCT/ISA/237) from corresponding Patent Cooperation Treaty Application No. PCT/US2015/040094, mailed Oct. 6, 2015.

(Continued)

*Primary Examiner* — Yolanda Cumbess
(74) *Attorney, Agent, or Firm* — Gardner, Linn, Burkhart & Flory, LLP

(57) ABSTRACT

A method of filling orders and order fulfillment system includes storing inventory receptacles in an automated warehouse, some having a plurality of different types of inventory items. A queue of orders is maintained in a computer system, each including at least one inventory item. Each order is selected from the queue and assigned to a pick station. The computer system retrieves inventory receptacle (s) from the automated warehouse for the selected order and supplies the receptacle(s) to the pick station. The computer system identifies to an operator which inventory item is to be segregated with the selected order in at least one put receptacle. One or more of the put receptacles receives inventory items for at least one individual order and is directed to a secondary order processing station where items are separated into individual orders. The operator may be provided the capability to consolidate inventory items from inventory receptacles while picking orders to consolidate partially filled inventory receptacles in a consolidated inventory receptacle.

23 Claims, 8 Drawing Sheets

(56) References Cited

U.S. PATENT DOCUMENTS

| | | |
|---|---|---|
| 6,011,998 A | 1/2000 | Lichti et al. |
| 6,289,260 B1 | 9/2001 | Bradley et al. |
| 6,505,093 B1 | 1/2003 | Thatcher et al. |
| 7,363,104 B2 | 4/2008 | Stevens |
| 8,170,712 B2 | 5/2012 | Battles et al. |
| 8,327,609 B2 | 12/2012 | Krizmanic et al. |
| 8,335,585 B2 | 12/2012 | Hansl et al. |
| 8,682,474 B2 | 3/2014 | Rotella et al. |
| 8,718,814 B1 | 5/2014 | Clark et al. |
| 8,855,806 B2 | 10/2014 | Hara et al. |
| 8,892,240 B1 | 11/2014 | Vilet et al. |
| 8,952,284 B1 | 2/2015 | Wong et al. |
| 8,974,168 B2 | 3/2015 | Yamashita |
| 9,014,844 B2 | 4/2015 | Casey et al. |
| 2005/0008463 A1 | 1/2005 | Stehr et al. |
| 2006/0182543 A1 | 8/2006 | Schaefer |
| 2011/0008137 A1 | 1/2011 | Yamashita |
| 2011/0295413 A1 | 12/2011 | Hara et al. |
| 2012/0101627 A1* | 4/2012 | Lert ............... B65G 1/1378 700/216 |
| 2012/0323746 A1 | 12/2012 | Mountz et al. |
| 2014/0124462 A1 | 5/2014 | Yamashita |
| 2014/0178161 A1 | 6/2014 | Moosburger et al. |
| 2014/0212257 A1 | 7/2014 | Yamashita |
| 2014/0350717 A1 | 11/2014 | Dagle et al. |
| 2015/0104286 A1 | 4/2015 | Hansl et al. |

FOREIGN PATENT DOCUMENTS

| | | |
|---|---|---|
| DE | 102009032406 A1 | 1/2011 |
| EP | 1486435 A1 | 12/2004 |
| EP | 1964792 A2 | 9/2008 |
| WO | 03064292 A1 | 8/2003 |
| WO | 2015007515 A1 | 1/2015 |

OTHER PUBLICATIONS

Commonly assigned co-pending U.S. Appl. No. 14/755,580, filed Jun. 30, 2015, entitled Lift Configuration for Carriage-Based Warehouse.

Commonly assigned co-pending U.S. Appl. No. 14/817,580, filed Aug. 4, 2015, entitled Order Fulfillment Technique.

Commonly assigned co-pending U.S. Appl. No. 62/021,901, filed Jul. 8, 2014, entitled Lift Configuration for Carriage-Based Warehouse.

Commonly assigned co-pending U.S. Appl. No. 62/032,920, filed Aug. 4, 2014, entitled Order Fulfillment Technique.

* cited by examiner

PICKING STATION WITH AUTOMATED WAREHOUSE

CROSS REFERENCE TO RELATED APPLICATION

This application claims priority from U.S. patent application Ser. No. 62/023,421, filed on Jul. 11, 2014, the disclosure of which is hereby incorporated herein by reference.

BACKGROUND OF THE INVENTION

The present invention is directed to an order fulfillment method and a system for carrying out such method and, in particular, to such method and system that is useful for processing a large number of orders in a relatively short period of time.

Order fulfillment of orders placed over the Internet must take place within a relatively short period of time in order to be commercially competitive. The same could be said for orders received by phone, facsimile or by the mail based on catalog or television-based merchandizing. Such order fulfillment is known as E-commerce and places demands on an order fulfillment system to meet such obligations. This is compounded by the fact that E-commerce usually involves a large number of small orders (each containing as few as one item in the order) that are selected from a large number of potential items. Each unique item has a specific inventory identification, known in the industry as a stock-keeping unit (SKU). Each item usually bears an optical code, such as a barcode or radio frequency identification (RFID) tag that identifies the SKU of the item.

Because of the large number of SKU's from which an order may be selected, the inventory warehouse may be very large in footprint. As such, it is common to designate geographic portions of the inventory warehouse to each be picked by an individual picker such that each picker picks only a portion of each order, since each order may be spread out over the entire general footprint of the inventory warehouse. Each picker is directed by a warehouse management system to pick portions of a number of orders using a various picking technology known in the art. It is efficient to have the picker mix several orders in one picking or picked receptacle rather than having multiple receptacles, each bearing one order portion. Also, each order may be contained in a number of picked receptacles if the order contains more than an individual item. However, it is then necessary to subsequently sort the contents of the picked receptacle(s) to the order and to process the items so that they can be packed-out for shipment via courier, or the like. Also, orders may be made up of items having various physical characteristics such that some items are not able to be readily handled by a conventional material-handling system.

SUMMARY OF THE INVENTION

Known systems are not only labor intensive but require multiple "touches" of the same item at the various portions of the process until the item or items are collected into orders ready for packing and shipping. Each "touch" not only adds to labor cost but also introduces the possibility of errors occurring. Thus, the present invention provides an enhanced system and method that greatly reduces inventory item "touches" as well as enhancing overall efficiency of an order fulfillment operation.

A method of filing orders and order fulfilment system, according to an aspect of the invention, includes storing a plurality of inventory receptacles in an automated warehouse, at least some of the inventory receptacles having a plurality of different types of inventory items in that inventory receptacle. A queue of orders to be filled is maintained in a computer system, each of the orders including at least one inventory item. At least one order is selected from the queue with the computer system and assigned to a pick station. The computer system retrieves at least one inventory receptacle from the automated warehouse having at least one item for the selected order and supplies the at least one receptacle to the pick station. The computer system identifies to an operator which inventory item in the retrieved inventory receptacle or receptacles is to be segregated with the selected order in at least one put receptacle.

When a secondary process station has the ability to process an order, that order becomes available for assignment to the pick station. The queue of orders may include virtual orders in the computer system and a plurality of orders may be assigned as assigned orders to be completed at the pick station. The queue of orders may have a filling sequence assigned to the orders and the assigning orders may include nominally assigning orders in sequence from the filling sequence and further includes assigning orders out of sequence for priority orders. Virtual orders allow the automated warehouse to plan ahead thereby enhancing performance and responsiveness of the automated warehouse feeding the workstation. Multiple customer orders may be grouped together in real time based upon secondary process station considerations. Thus, while it may refer to a single order, used herein, the term "order" means the accumulation of customer order line items for the same secondary process station from a particular pick station.

Some put receptacles may each receive inventory items for a plurality of orders and each such put receptacle is directed to a secondary order processing station where items are separated into separate orders. The secondary order processing station comprises a put station. The computer system may select at least one of the put receptacles as a singles order receptacle to receive inventory items that each comprise an entire order. The singles order receptacle is directed to a packing station where each of the items is individually packed as an order. A put receptacle may be subdivided into multiple compartments.

The operator may consolidate inventory items from at least two inventory receptacles while picking orders. The operator consolidates partially filled inventory receptacles in at least one consolidated inventory receptacle.

The queue of orders is made up of virtual orders, each destined for a common secondary process station or for packing. A plurality of said queue of orders may be assigned orders to be completed at the pick station. The queue of orders may have a fulfilling sequence assigned to the orders. The assigning of orders may include nominally assigning orders in sequence from the filling sequence and further including assigning orders out of sequence for priority orders.

The automated warehouse may include at least two stacked longitudinally extending racks that are laterally separated by an aisle and an automated carriage that travels the aisle at some of the levels to store articles to and retrieve articles from each of the racks at that level. At least some of the inventory receptacles may be subdivided into compartments. As least some of the inventory receptacles may be subdivided into compartments of one size and other of said inventory receptacles subdivided into compartments of a different size. The computer system may identify to an operator which of the compartments has the inventory item to be picked.

A method of fulfilling orders and order fulfilment system, according to an aspect of the invention, includes supplying a plurality of inventory receptacles from a supply of inventory receptacles to a pick station, each of the inventory receptacles carry at least one inventory item. A plurality of put receptacles are supplied to the pick station. Instructions are issued with a computer system having a queue of orders to an operator at the pick station to pick an order by removing at least one inventory item from at least one said inventory receptacle and placing the at least one inventory in a put receptacle. The operator is provided the capability to consolidate inventory items from at least two said inventory receptacles while picking orders, wherein the operator consolidates partially filled inventory receptacles in at least one consolidated inventory receptacle.

The consolidating may include positioning a receptacle on a working surface that is accessible to the operator wherein the receptacle on the working surface receives at least one of the inventory receptacles for consolidation to become a consolidated inventory receptacle and including discharging the consolidated inventory receptacles to the inventory storage. Instructions may be issued with the computer system to the operator that a particular inventory receptacle has a volume of inventory items that is below a threshold and therefore can be consolidated.

The computer system may select at least one of the put receptacles as a singles order receptacle to receive inventory items that each comprise an entire order and directs the singles order receptacle to a packing station where each of the items is packed as an order. The computer system may select at least one of the put receptacles to receive inventory items for a plurality of orders and direct that put receptacle to a secondary order processing station. The items are separated into separate orders at the secondary order processing station. The secondary order processing station may be a put station.

The supply of inventory receptacles may be an automated warehouse. Another operator may consolidate inventory items from multiple inventory receptacles into consolidated inventory receptacles. This may include discharging consolidated inventory receptacles consolidated by the other operation to the working surface.

These and other objects, advantages and features of this invention will become apparent upon review of the following specification in conjunction with the drawings.

DESCRIPTION OF THE PREFERRED EMBODIMENT

Figure 1:
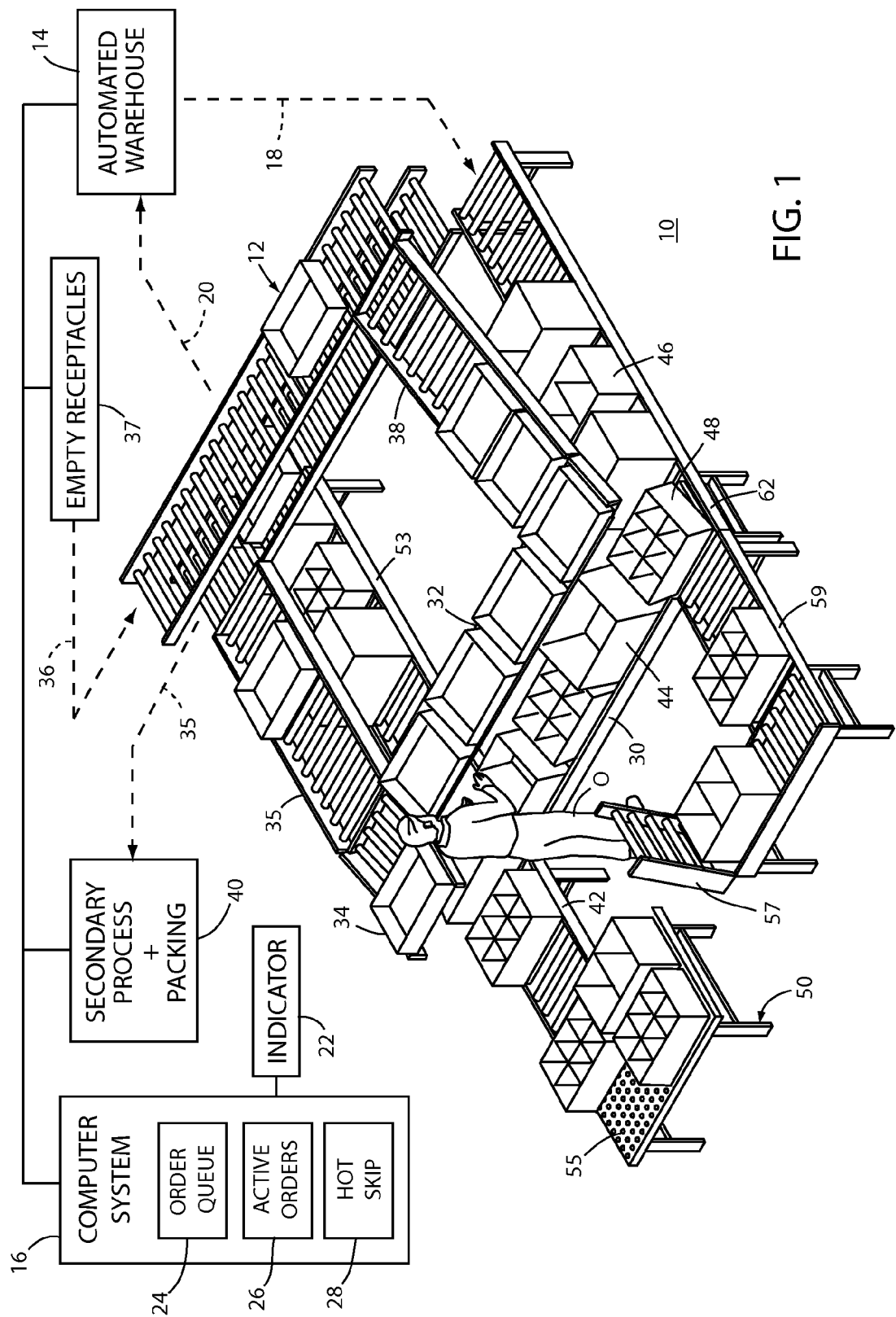
FIG. 1 is a perspective view of an order fulfillment system and method according to an embodiment of the invention.
Figure 2:
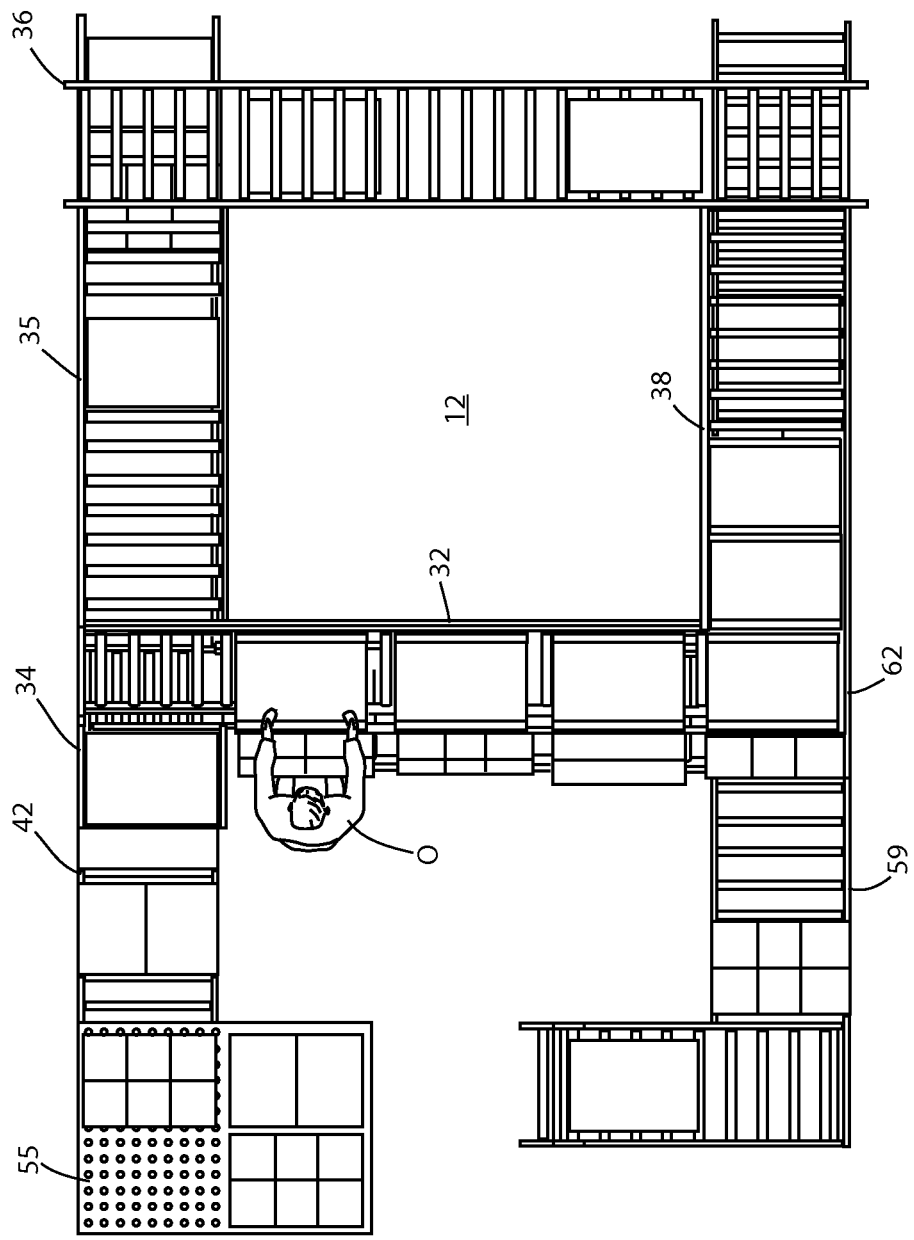
FIG. 2 is a top plan view of the order fulfillment system and method in FIG. 1.
Figure 3:
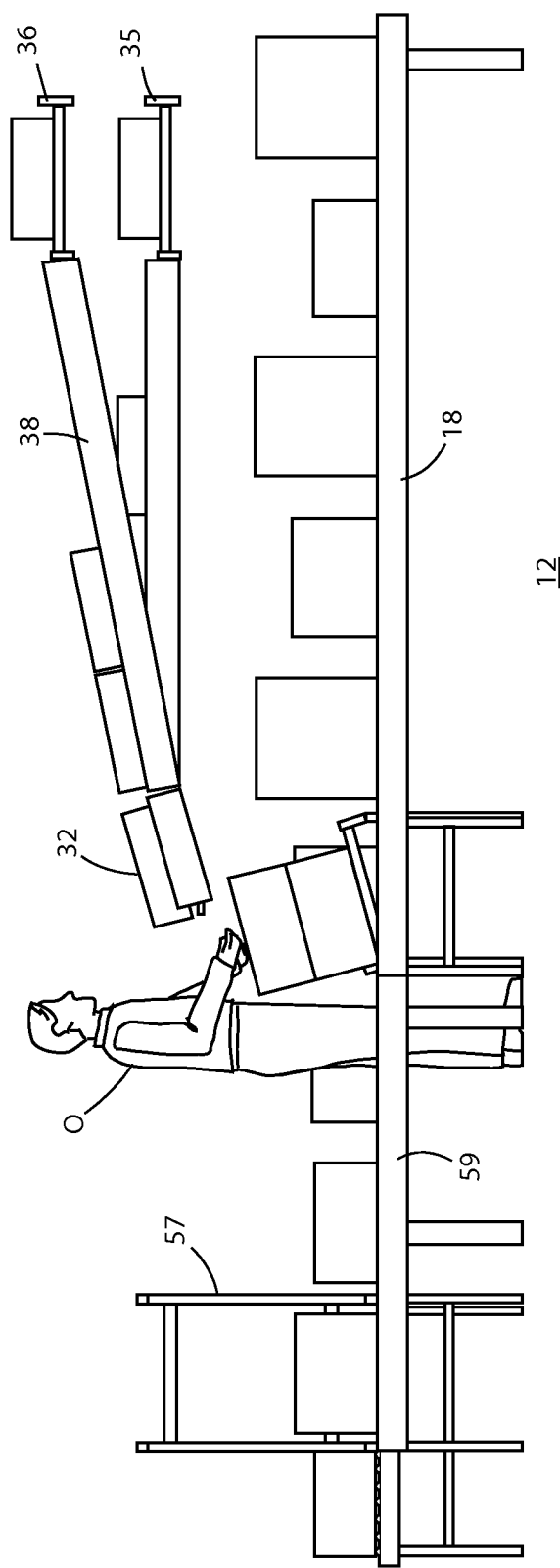
FIG. 3 is a side elevation view of the order fulfillment system and method in FIG. 1.
Figure 4:
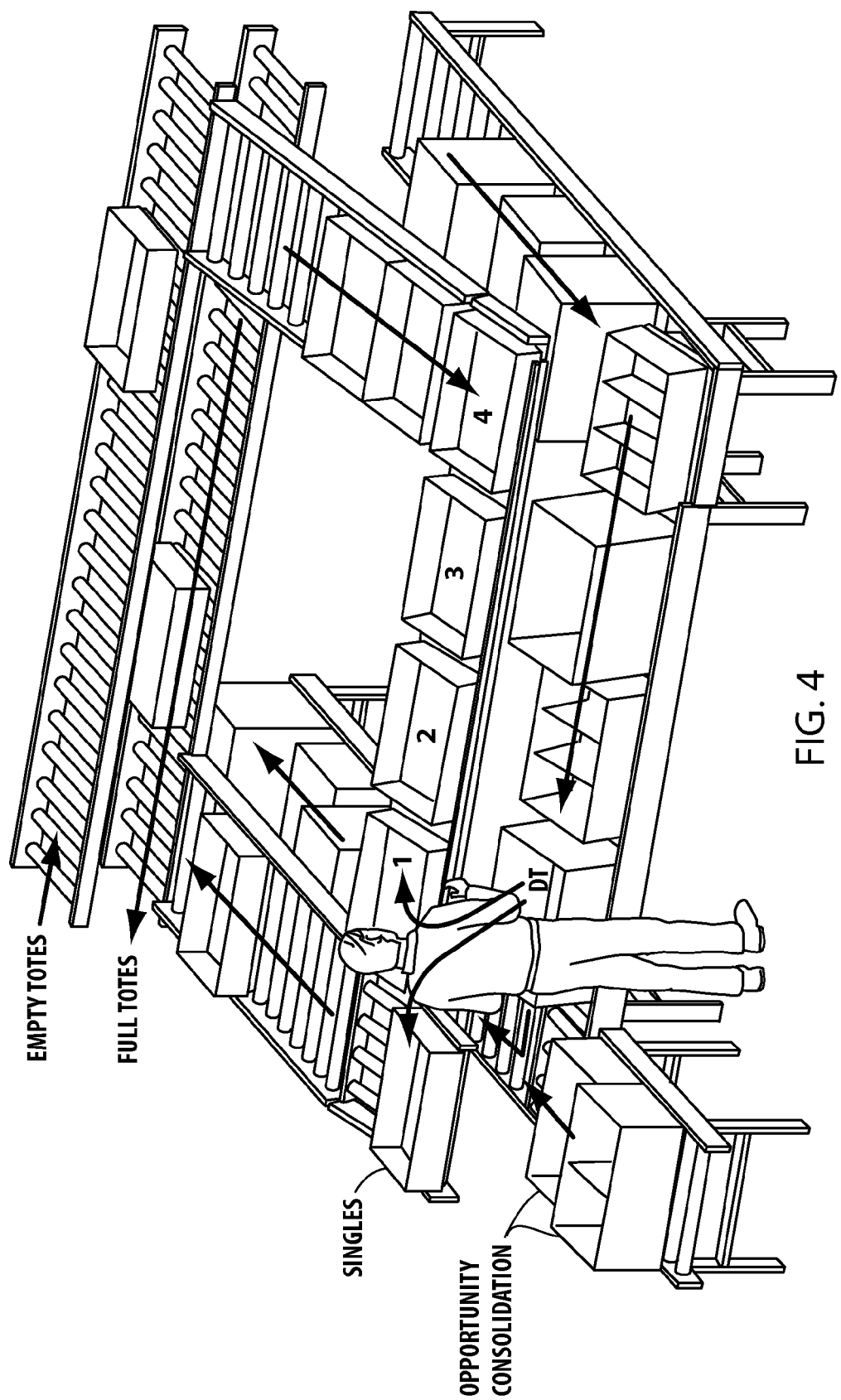
FIG. 4 is a perspective view illustrating operation of the system and method in FIG. 1.
Figure 5:
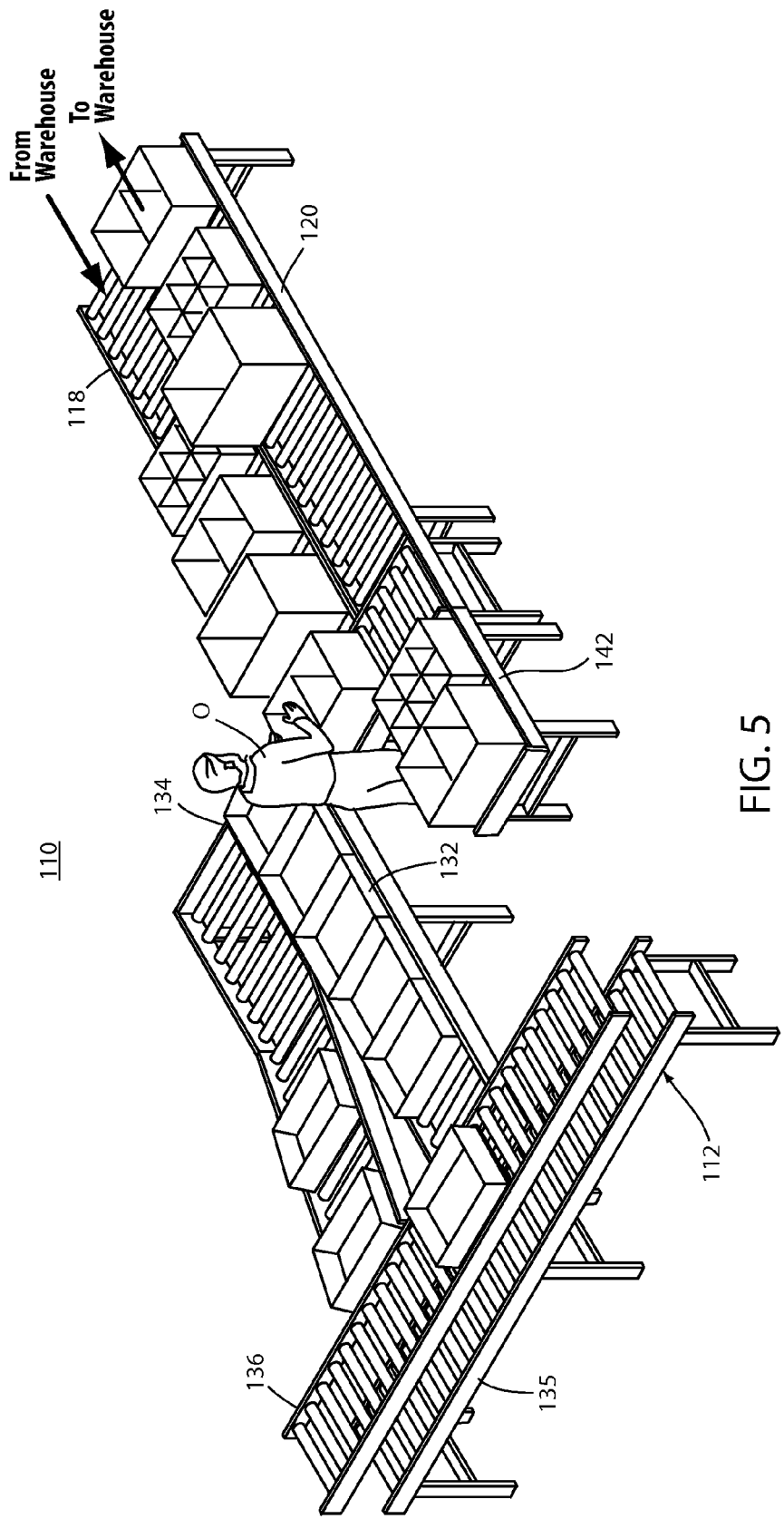
FIG. 5 is a perspective view of an order fulfillment system and method according to an alternative embodiment of the invention.
Figure 6:
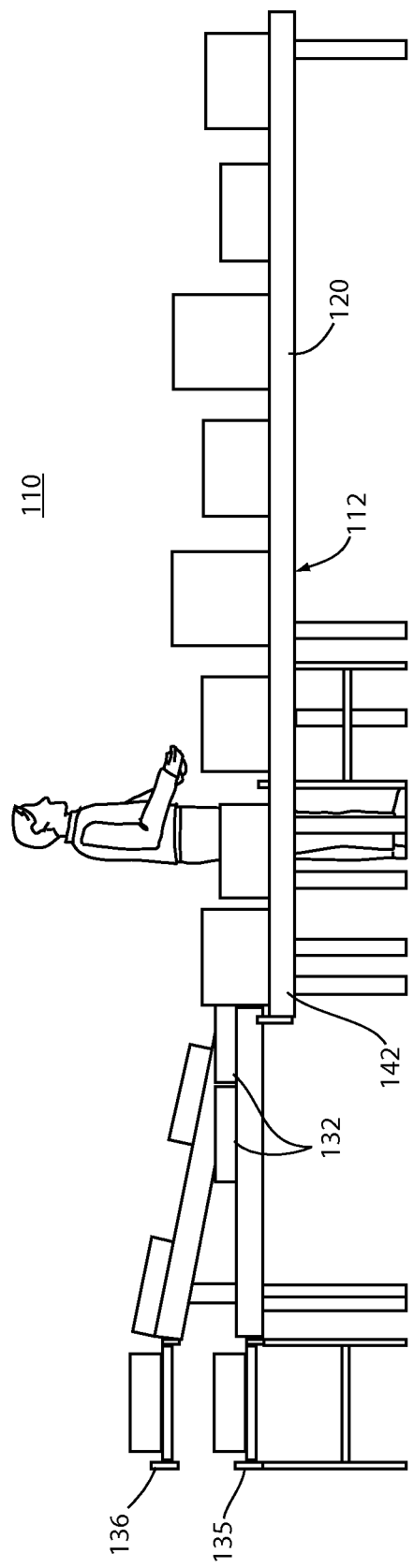
FIG. 6 is a side elevation view of the order fulfillment system and method in FIG. 5.
Figure 7:
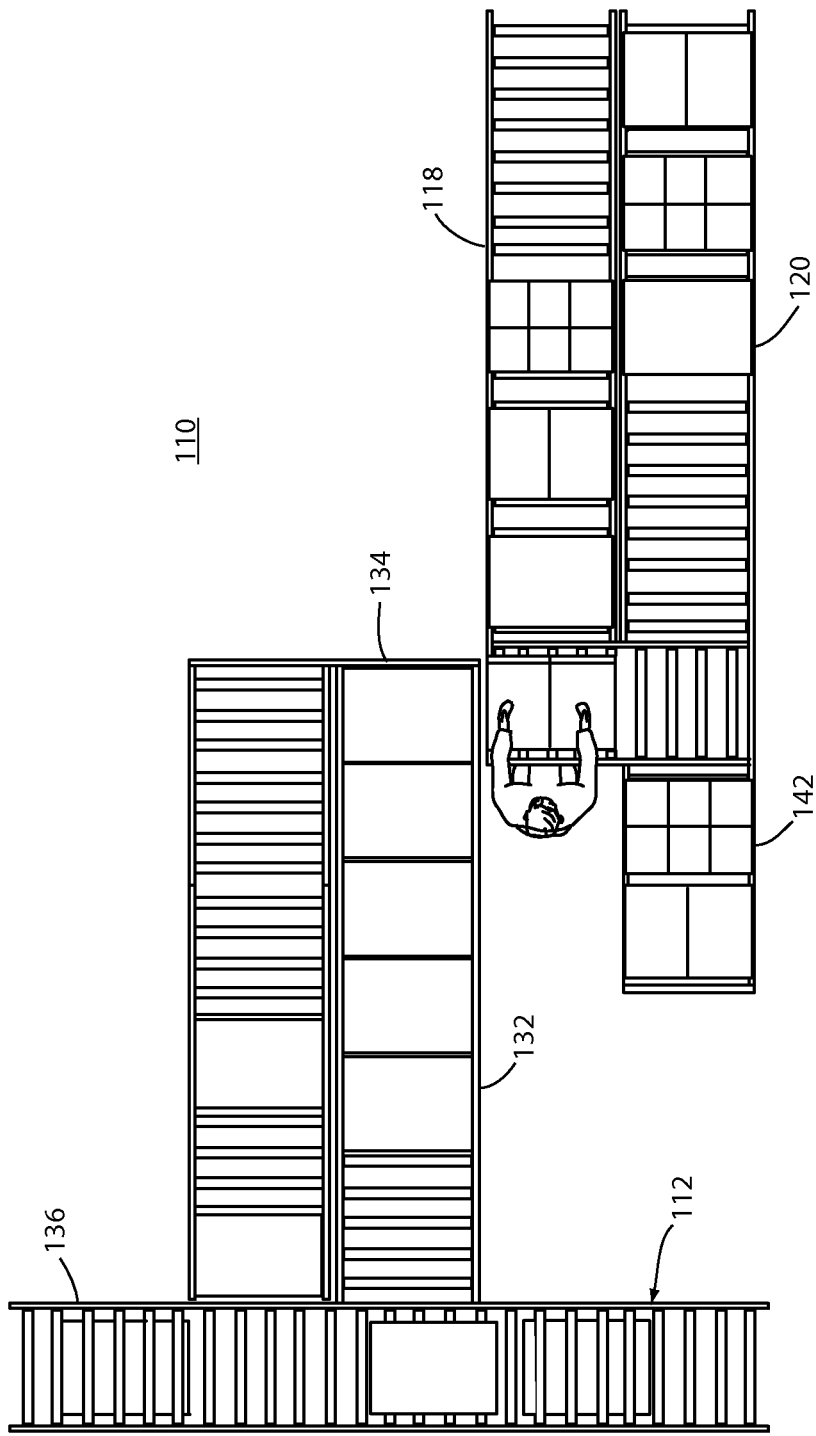
FIG. 7 is a top plan view of the order fulfillment system and method in FIG. 5.
Figure 8:
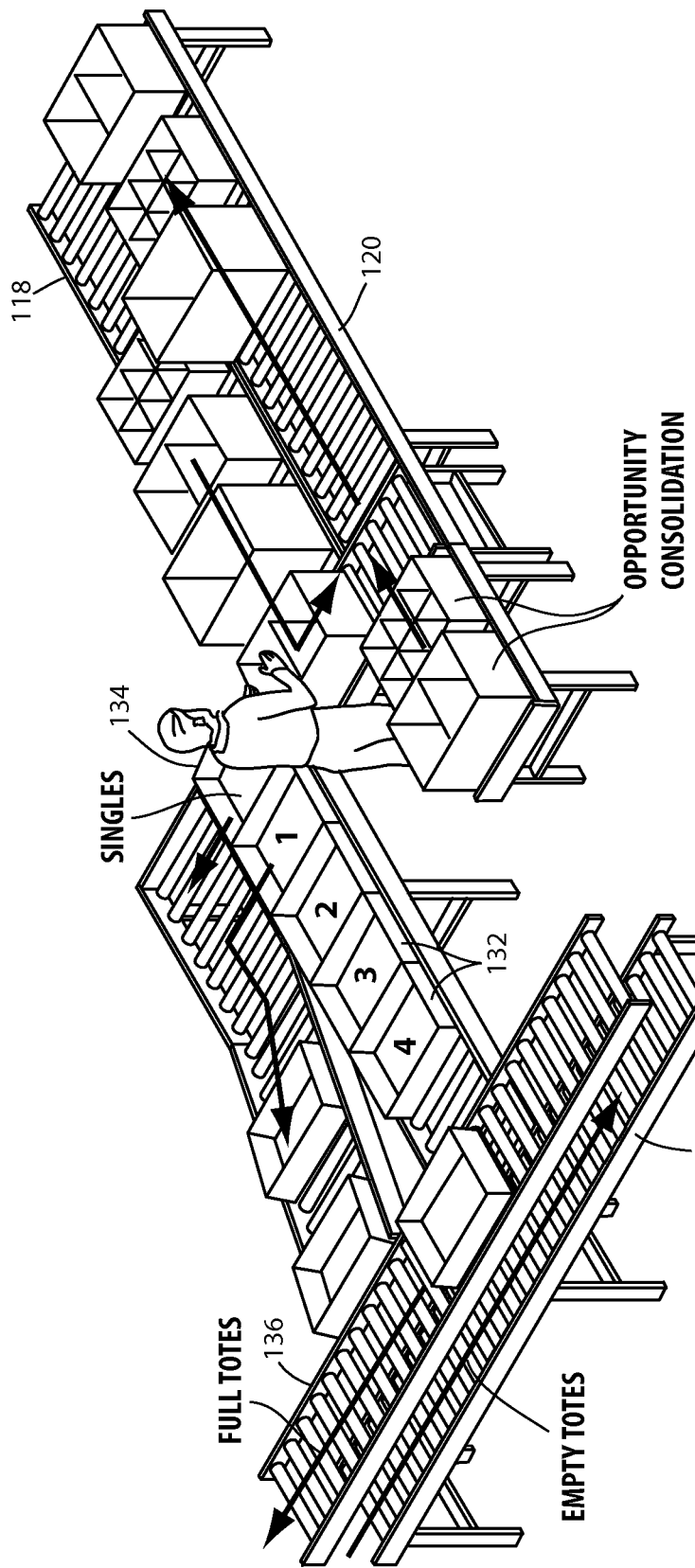
FIG. 8 is a perspective view illustrating operation of the system and method in FIG. 5.

Referring now to the drawings and the illustrative embodiments depicted therein, an order fulfilment system 10 includes a pick station 12, an automated warehouse 14 for supplying inventory receptacles with an inventory receptacle supply line 18 to the pick station and for receiving processed inventory receptacles with an inventory receptacle receipt line 20 (FIG. 1). Inventory receptacles are supplied to automated warehouse 14 from a receiving function (not shown) that receives raw inventory to the warehouse. Automated warehouse 14 may be of the type disclosed in U.S. patent application Ser. No. 62/021,901 filed Jul. 8, 2014, by Criston S. Stevens for a LIFT CONFIGURATION FOR CARRIAGE-BASED WAREHOUSE, the disclosure of which is hereby incorporated herein by reference in its entirety. A computer system 16 provides all of the necessary instructions that coordinates automated warehouse 14 and pick station 12 including an indicator 22 that identifies to an operator O each inventory item that is to be picked, from an inventory receptacle at an inventory receptacle line 30 and placed in a put receptacle, as well as other instructions. The put receptacle may be on a multiple-item-order put line 32 which is adapted to accumulate various items for orders that contain more than one item. The put receptacles may be on a singles order put line 34 which is adapted to accumulate various items for orders that contain only one item per order. Also, inventory receptacles having a quantity of a particular item or items for an order may be routed by the computer system directly from automated warehouse 14 to the secondary process, thus bypassing pick station 12.

Receptacles from multiple-item-order put line 32 and singles order put line 34 are combined and dispatched with order output line 35 to secondary process or packing at 40. Alternatively, multiple-item-order put line 32 receptacles or singles order put line 34 receptacles may be routed to automated warehouse 14 for buffering and future delivery to secondary process or packing 40. Secondary process is for multiple-item-order put receptacles from line 32 which receives one or more multiple-item-order receptacles for further sortation to individual orders. The secondary process may be a put function such as a plurality of putwalls or other known order accumulation function of the type known in the art. Each receptacle from multiple-item-order put line 32 is intended to go to one and only one secondary put function but multiple receptacles from put line 32 will go to each secondary put function.

At the secondary function, an operator or a form of automation, such as a robotic arm, will remove each item from the put receptacle and identify that item, such as with a barcode scanner or other technique, and computer system 16 will identify the location on the putwall where the order for that item is being assembled. The packing function of 40 is for receipt of singles receptacles from singles order put line 34. Each singles receptacle will typically have a plurality of different types of items and/or multiple quantities of the same type of item, each destined for an individual single item order. Thus, at packing, the operator will identify each item, such as with a barcode scanner, or the like, and computer system 16 will match that item with an order and will provide the necessary packing and shipping instructions for that order. Alternatively, packing may be an automated process thus not requiring an operator.

Inventory receptacles are stored in automated warehouse 14 until retrieved under control of computer system 16. Inventory receptacles may be a plurality of different types based on the inventory items in that inventory receptacle. For example, large product receptacles 44 have no dividers and are capable of handling items of large cubic volume, medium product receptacles 46 can be divided into two compartments for handling medium volume items and small product receptacles 48 can be divided into a variety of compartments for handling items of smaller cubic volume. It should be understood that more than one item can be stored and transported in each compartment and items in each compartment do not need to be of the same type, or SKU, they only need to have a cubic volume that is suitable for that item. Each receptacle, regardless of size, is identified by a unique identification, or "license plate" that can be read by a barcode scanner, RFID, or other identification reading system, such that computer system 16 has awareness of the functional location of the receptacles within the system and the content of each receptacle.

Computer system 16 maintains a queue 24 of orders to be released to the secondary process station. The orders are entered by a warehouse management system from customer orders or intra-company warehouse orders and each of the orders include one or more inventory items for that order. Orders may be processed using the technique disclosed in commonly assigned U.S. patent application Ser. No. 62/032,920 filed Aug. 4, 2014, by Criston S. Stevens and Martin E. Schubilske for an ORDER FULFILLMENT TECHNIQUE, the disclosure of which is hereby incorporated herein by reference in its entirety. The computer system nominally fills orders in sequence from order queue 24. Orders actively being filled are held in an active order queue 26, with a number, such as five (5) active orders at a time in the illustrative embodiment. Active orders, which do not include single item orders, are being filled in the multiple order put receptacles 32 with inventory receptacles being cycled from automated warehouse 14 bearing inventory items that are primarily destined for the multiple order put receptacle directly in front of the operator. However, some of the inventory receptacles will have items for the other active orders being fulfilled in multiple order put receptacles 32 as well as items for singles orders which are placed in single order put receptacle 34. As the multiple order put receptacle 32 in front of the operator is complete, usually based on the cubic volume utilization, or "cubes", accumulated in that receptacle, or the single order receptacle 34 is complete, computer system 16 either conveys the receptacle 32 or 34 to order output line 35 using powered conveyor and/or right angle transfers, or instructs the operator to manually do so.

The operator places items from the inventory receptacle to the appropriate put line 32, 34 receptacle under instruction from computer system 16. The computer system may instruct the operator by displaying on an indicator, such as a display 22, an image of that item and/or may aim a laser pointer (not shown) at the item in the receptacle or at least the compartment in the receptacle containing the item. The operator will remove the item from the inventory receptacle and may scan the item to confirm that the operator has picked the correct item and, upon confirmation by computer system 16, place the item in one of the put line receptacles 32, 34. Alternatively, a logical tracking system or other known technique may be used to identify an item. Various indicators may be used to identify which of the receptacles 32, 34 to put the item. Also, system 10 has the ability to resolve quality issues such as "lost" items, which are items that are not put in the correct put line 32, 34 receptacle such as when an item is fallen to the floor, or the like, as will be explained below.

As orders are fulfilled by system 10, computer system 16 continues to move orders from their nominal sequence of order queue 24 to active order queue 26. Computer system 16 also includes a hot skip function 28 which causes computer system 16 to respond to an indication that an order is of high priority by placing that order directly into active order queue 26. Hot skip function 28 allows a priority order, such as one needed to be completed for same day or overnight fulfillment, or the like, to skip order queue 24 and get placed in the active order queue 26 ahead of its nominal sequence. In this manner the hot skip function 28 will allow a priority order to arrive at pick station 12 after the next active order is processed.

Thus, the method disclosed herein uses smart logic for real-time selection of optimal receptacles to move from the automated warehouse whenever a pick station completes an order receptacle that is sent to secondary processing or packing. This logic interleaves multiple-item line receptacle requirement delivery with singles-line receptacle requirement to increase frequency of operator interaction with the put receptacles closest to the inventory receptacle.

Order fulfillment system 10 additionally includes an opportunity consolidation function. The operator is provided the ability to consolidate inventory items from at least two inventory receptacles while picking orders. The operator consolidates partially filled inventory receptacles in at least one consolidated inventory receptacle. Pick Station 12 includes an opportunity consolidation station, such as a platform 42 that includes an empty or partially filled inventory receptacle. Computer system 16 instructs the operator, such as via indicator 22 that an incoming inventory container is ripe for consolidation based upon its "cubes". The operator then transfers remaining inventory from the inventory receptacle to a target consolidation receptacle at consolidation station 42 in order to increase the items in the consolidation receptacle. Once a receptacle ripe for consolidation is empty, it may be returned to empty tote supply 37 via an overhead conveyor line, or the like, (not shown). Once a consolidate inventory receptacle has accumulated a sufficient amount of inventory "cubes," it is discharged from consolidation platform 42 to feed line 53 for return to automated warehouse 14. The discharge of the consolidate inventory receptacle may be manual by the operator or may be automated under the control of computer system 16 using powered conveyors, automated vehicles, or the like. Computer system 16 may use the principles disclosed in U.S. Pat. No. 7,877,164 and U.S. Patent Application Publication No. 2010/0150689, the disclosures of which are hereby incorporated herein by reference, for consolidating inventory containers. Also, lost items can be scanned by the operator for identification and returned to the consolidation receptacle at platform 42 for re-entry to inventory.

Pick station 12 may further include a secondary consolidation station 50 that can be used by operator O when not fulfilling orders or can be used by another operator (not shown) to consolidate inventory items from multiple inventory receptacles into consolidated inventory receptacles. Secondary consolidation station 50 includes a platform such as a removable conveyor, roller table 55, or the like, for supporting the receptacle into which the items are consolidated and a supply 59 of combinable inventory receptacles. Secondary consolidation station 50 includes a discharge 60 which discharges consolidated inventory receptacles consolidated by the other operation to the platform of consolidation station 42 and from platform 42 to feed 53 back to automated warehouse 14. A sortation device, such as a right angle transfer 62, can be operated by computer system 16 to direct certain inventory receptacles to inventory receipt line 30 for placement in orders and/or opportunity consolidation or to supply line 59 for secondary consolidation. A gate 57 is provided to allow the primary operator O to enter and exits the picking station. Thus, secondary consolidation station 50 can be used by adding employees during peak operation of system 10 such as prior to holidays. It can also be used by operator O when not fulfilling orders.

In an alternative order fulfillment system and method 110, including pick station 112, shown in FIGS. 5-8, inventory receptacles are supplied to an operator from an automated warehouse (not shown) via an inventory receipt supply line 118 and returned to the automated warehouse via an inventory return line 120. Empty receptacles are supplied from an empty tote supply line 136 to a put line 132 where one of the put receptacles 134 is a single order put container and multiple other of the put receptacles are multiple order put receptacles 132. Put receptacles 132, 134 are sent to secondary processing or packing (not shown) via an order output line 135. An opportunity consolidation station 142 provides the operator the ability to consolidate items into receptacles. Empty receptacles are sent to an empty receptacle supply (not shown) via an overhead conveyor, or the like, and consolidated receptacles as well as receptacles that have had items removed are returned to the automated warehouse with return line 120.

The ability to consolidate inventory receptacles on the fly allows the system to maintain a relatively high concentration in the inventory receptacles stored in the automated warehouse and reduce system receptacle movement. Also, empty receptacles are removed, staged or immediately sent to the inbound receiving function where they can be stocked with items and sent directly to the automated warehouse as inventory receptacles. Essentially, items are only handled when they arrive at the warehouse in bulk, when they are picked from the inventory receptacle and when they are separated into individual orders at the secondary process operation. Singles order are only touched twice, not counting the packing and shipping operation. While opportunity consolidation may be considered another touch, it is merged into the other functions of the operator and, therefore, does not add significantly to the overall cycle time of the entire order fulfillment process. The consolidation generates empty receptacles for raw inventory induction to the system while increasing cube utilization of the automated warehouse. Optionally, the ability to perform secondary consolidation of the inventory receptacles allows the primary operator to be dedicated to the picking function and additional operators to be used to handle peak flow without the need for duplicating the entire work station.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of filing orders, comprising:
   storing a plurality of inventory receptacles in an automated warehouse, at least some of said inventory receptacles having a plurality of different types of inventory items in that inventory receptacle;
   maintaining a queue of orders to be filled in a computer system, each of said orders including at least one inventory item, each of the orders comprising an individual order or group of individual orders;
   selecting at least one order from the queue with the computer system and assigning that at least one order to a pick station;
   said computer system retrieving at least one inventory receptacle from said automated warehouse having at least one inventory item for the selected order and supplying the at least one receptacle to the pick station; and
   said computer system identifying to an operator which inventory item in the retrieved inventory receptacle or receptacles is to be segregated with the selected order in at least one put receptacle;
   wherein said at least one put receptacle receives inventory items for at least one individual order and including directing the at least one put receptacle to a secondary order processing station and including separating items into individual orders at said secondary order processing station.

2. The method as claimed in claim 1 wherein said secondary order processing station comprises a put station.

3. The method as claimed in claim 1 wherein said computer system selects at least one of said put receptacles as a singles order receptacle to receive inventory items that each comprise an entire individual order and directing the singles order receptacle to a packing station where each of the items is individually packed as an individual order.

4. The method as claimed in claim 1 including the operator consolidating inventory items from at least two said inventory receptacles while picking orders, wherein the operator consolidates partially filled inventory receptacles in at least one consolidated inventory receptacle.

5. The method as claimed in claim 1 wherein said queue of orders is made up of virtual orders, each destined for a common secondary process station or for packing.

6. The method as claimed in claim 5 including assigning a plurality of said queue of orders as assigned orders to be completed at said pick station.

7. The method as claimed in claim 5 wherein said queue of orders has a fulfilling sequence assigned to the orders and wherein said assigning orders includes nominally assigning orders in sequence from the filling sequence and further including assigning orders out of sequence for priority orders.

8. The method as claimed in claim 1 wherein said automated warehouse comprises at least two stacked longitudinally extending racks that are laterally separated by an aisle and an automated carriage that travels said aisle at some of the levels to store articles to and retrieve articles from each of the racks at that level.

9. The method as claimed in claim 1 wherein at least some of said inventory receptacles are subdivided into compartments.

10. The method as claimed in claim 9 wherein as least some of said inventory receptacles are subdivided into compartments of one size and other of said inventory receptacles are subdivided into compartments of a different size.

11. The method as claimed in claim 9 wherein said computer system identifies to an operator which of the compartments has the inventory item to be picked.

12. An order fulfillment system, comprising:
an automated warehouse storing a supply of inventory receptacles, at least some of said inventory receptacles having a plurality of different types of inventory items in that inventory receptacle, each of the orders comprising an individual order or group of individual orders;
a supply of put receptacles;
a pick station having a pick location receiving the inventory receptacles and put receptacles;
said computer system retrieving at least one inventory receptacle from said automated warehouse having at least one inventory item for a particular order and supplying the at least one receptacle to the pick station; and
a computer system having a queue of orders, said computer system issuing instructions to an operator at the pick location to pick an order by removing at least one inventory item from at least one said inventory receptacle and placing the at least one inventory in a put receptacle;
wherein said computer system selects at least one of said put receptacles to receive inventory items for at least one individual order, each of the individual orders being separated from each other at a secondary order processing station.

13. The order fulfillment system as claimed in claim 12 including an opportunity consolidation station that is accessible from said pick position, said opportunity consolidation station providing a working surface that receives at least one of said of the inventory receptacles for allowing the operator to consolidate inventory items from at least two said inventory receptacles and a discharge from said working surface to the supply of inventory receptacles, wherein the operator can consolidate partially filled inventory receptacles at the opportunity consolidation station.

14. The order fulfillment system as claimed in claim 13 wherein said computer system issues instructions to the operator that a particular inventory receptacle has a volume of inventory items that is below a threshold and therefore can be consolidated at said consolidation station.

15. The order fulfillment station as claimed in claim 13 including another consolidation station, said another consolidation station operable by another operator to consolidate inventory items from multiple inventory receptacles.

16. The order fulfillment station as claimed in claim 15 wherein said another consolidation station includes a discharge to said working surface.

17. The order fulfillment system as claimed in claim 12 wherein said computer system selects at least one of said put receptacles as a singles order receptacle to receive inventory items that each comprise an entire order, said singles order receptacle sent to a packing station where each of the items is packed as an order.

18. The order fulfillment system as claimed in claim 12 wherein said secondary order processing station comprises a put station.

19. The order fulfillment system as claimed in claim 12 wherein said automated warehouse comprises at least two stacked longitudinally extending racks that are laterally separated by an aisle and an automated carriage that travels along said aisle at some of the levels to store articles to and retrieve articles from each of the racks at that level.

20. The order fulfillment station as claimed in claim 12 wherein at least some of said inventory receptacles are subdivided into compartments.

21. The order fulfillment station as claimed in claim 20 wherein as least some of said inventory receptacles are subdivided into compartments of one size and other of said inventory receptacles are subdivided into compartments of a different size.

22. The order fulfillment station as claimed in claim 12 wherein said queue of orders comprises virtual orders in said computer system and wherein said computer system assigns a plurality of said queue of orders as assigned orders to be completed at said pick station.

23. The order fulfillment station as claimed in claim 22 wherein said queue of orders has a filling sequence assigned to the orders and wherein said computer system nominally assigns orders in sequence from the filling sequence and further including assigning orders out of sequence for priority orders.

* * * * *